No. 796,398.  PATENTED AUG. 1, 1905.
G. H. BIRCHARD.
CONCRETE FOUNDATION FOR WAGON AND TRACK SCALES.
APPLICATION FILED FEB. 2, 1905.
2 SHEETS—SHEET 2.
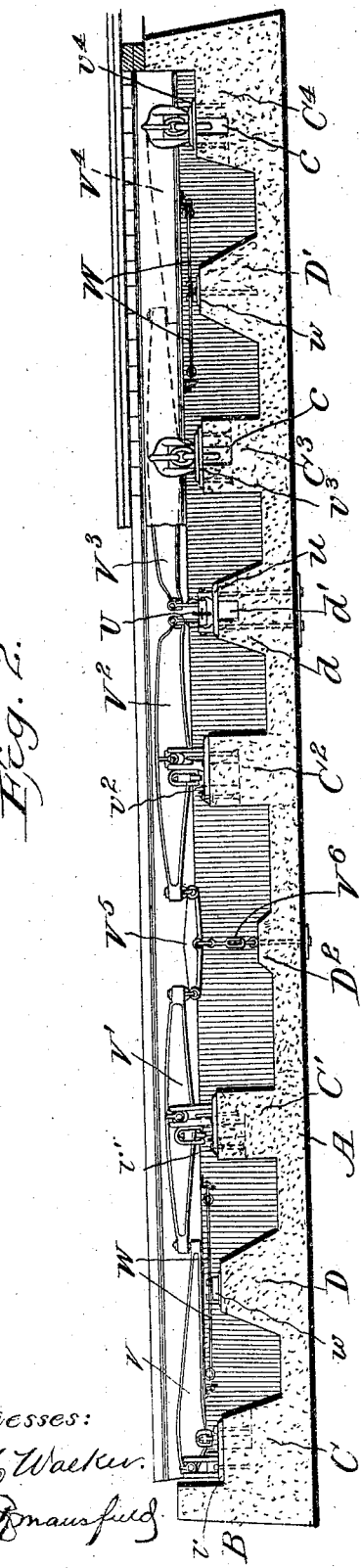
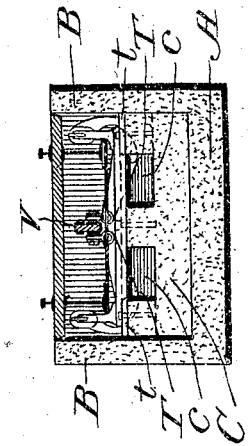
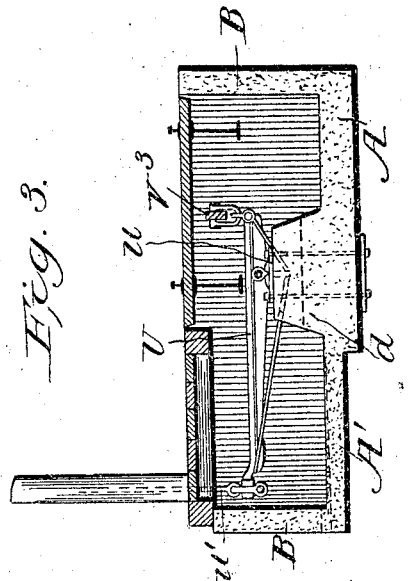

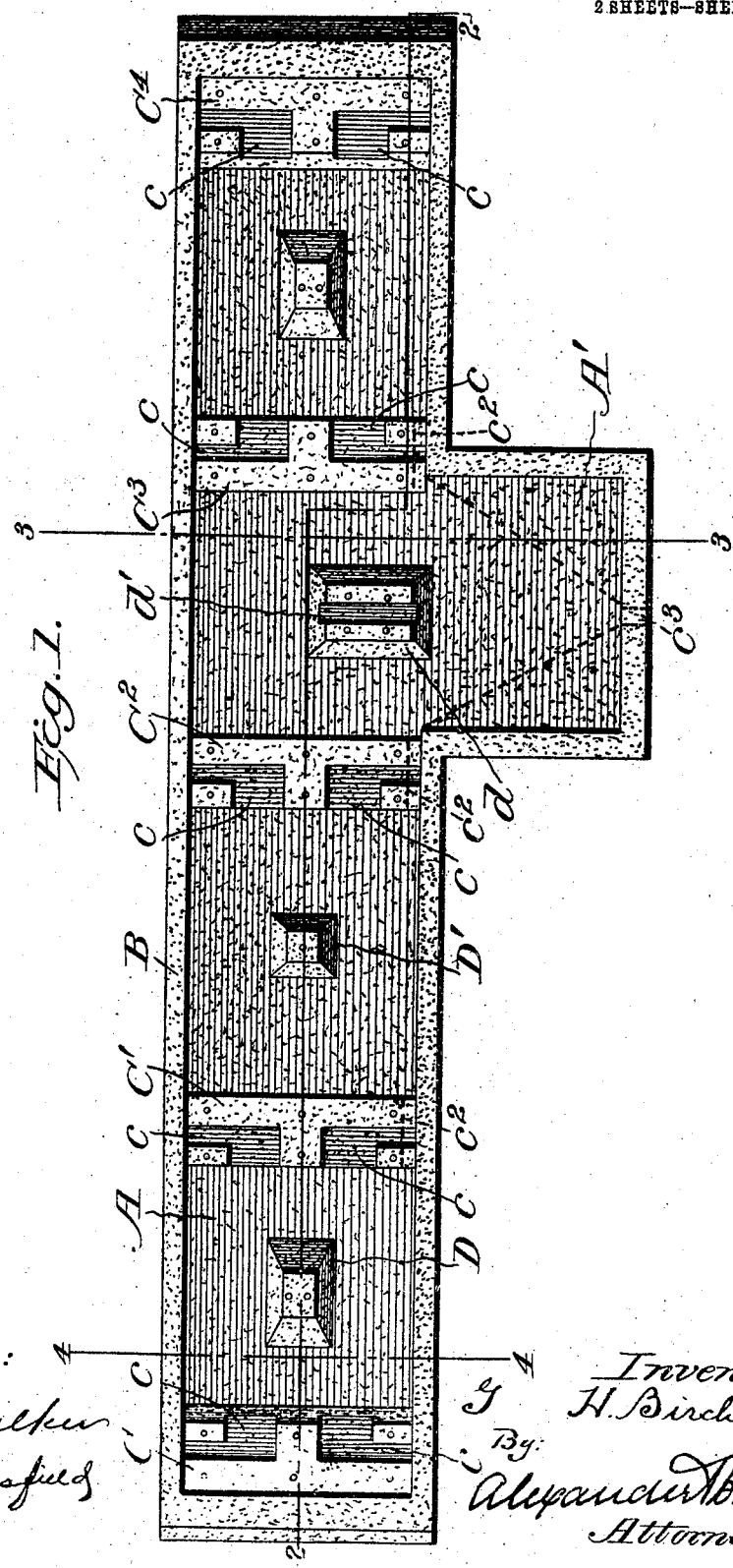

UNITED STATES PATENT OFFICE.

GEORGE H. BIRCHARD, OF LINCOLN, NEBRASKA.

CONCRETE FOUNDATION FOR WAGON AND TRACK SCALES.

No. 796,398.     Specification of Letters Patent.     Patented Aug. 1, 1905.

Application filed February 2, 1905. Serial No. 243,889.

*To all whom it may concern:*

Be it known that I, GEORGE H. BIRCHARD, of Lincoln, in the county of Lancaster and State of Nebraska, have invented certain new and useful Improvements in Concrete Foundations for Wagon and Track Scales; and I hereby declare that the following is a full, clear, and exact description thereof, reference being had to the accompanying drawings, which form part of this specification.

This invention is an improved scale-foundation especially designed for wagon and track scales; and its object is to provide a timberless scale-foundation in which all the bearing-points of the scale will be firmly and directly anchored on solid connected supports and protected by inclosing walls and bottom, so that the bearing parts will not be disarranged by water, weather, or climatic changes, or rodents, or any of the causes which render wooden foundations or the use of wood in scale-foundations objectionable, and from which vegetable growths are excluded, and the bottom or base plate serves as a rigid lateral brace to keep all the piers and bearing-points in exact alinement and position. The foundation as a whole might be aptly described as a hollow pan-like vessel, formed, preferably, of concrete or masonry, with bottom, side walls, and piers all rigidly connected and mutually reinforcing each other, no wooden or metal beams being used in its construction and the scale-bearings being secured directly to the foundation by tie-bolts embedded therein.

The accompanying drawings illustrate the foundation for a railroad-track scale embodying my invention, and I will describe the same with reference thereto, premising that the invention is not restricted to the specific construction of scale shown in the drawings, and the size and particular locations of bearing-points or scale-supports in the foundation would of course be varied to suit the particular style of scale to be mounted thereon.

In the drawings, Figure 1 is a top plan view of the complete foundation of a railroad-track scale with the scale removed. Fig. 2 is a longitudinal section therethrough on line 2 2, Fig. 1, with scale in place. Fig. 3 is a transverse section on line 3 3, Fig. 1, with scale in place; and Fig. 4 is a transverse section on line 4 4, Fig. 1.

The foundation comprises a base-plate A slightly greater in extent than the superficial area of the complete scale-platform S and having a lateral extension A' at one side for the accommodation of the computing-levers and weigher's platform. Surrounding the edges of the base-plate A and rising therefrom are walls B, which surround the sides and ends of the entire base-plate and are uniform in height and unbroken, so that the walls and base-plate form a large pan-like structure. Within this pan, at the opposite ends thereof, are enlarged abutments C C$^4$, and at equidistant intermediate points in the length of the pan are similar transverse abutments C' C$^2$ C$^3$, (three being shown,) said abutments being exactly uniform in height or made to suit the scale desired and supporting the bearing-plates $t\ t$ of the transverse scale-platform-supporting levers T T, which are connected to the centrally-arranged row of equalizing-levers V V' V$^2$, as indicated in the drawings.

The bearing-plates $v\ v^4$ for the end levers V V$^4$ are mounted on abutments C C$^4$ intermediate the bearing-plates $t$. The bearing-plates $v'\ v^2\ v^3$ for levers V' V$^2$ V$^3$ are mounted on the abutments C' C$^2$ C$^3$ intermediate the bearing-plates $t$ thereon.

Intermediate the abutments C C' is a pier D, to which is fastened the stay-plate $w$ of the stay-rods W, which hold the scale-platform against longitudinal play. A similar pier D' is formed between the abutments C$^3$ C$^4$ for a like purpose. Intermediate the abutments C' C$^2$ is a pier D$^2$, to which is anchored chain-rod V$^6$ and turnbuckle for adjusting the connecting-lever of the equalizing-bar V$^5$, connected to and between the levers V' V$^2$. Intermediate the abutments C$^2$ C$^3$ is a projection $d$, on which is mounted the bearing-plate $u$ of the compounding-lever U, which projects into the offset A' and is connected by rod $u'$ to the computing-levers. (Not shown.)

The scale indicated in the drawings is commonly known as a "railroad-track scale;" but the particular construction and connections of the scale-levers, &c., forms no part of my present invention. Therefore it is not requisite to minutely or accurately describe the same. It is essential, whatever scale be used, that all the bearing-plates of the scale-levers be exactly alined and supported in an exact plane or to suit the design of the particular scale to be erected, and such supports are afforded by the abutments and piers, as shown and described. The entire foundation (base, side walls, abutments, and piers) is preferably composed of concrete, molded in position, so that when complete and dry it forms practically a single solid mass of concrete, the scale-levers and platform being entirely incased and protected by solid walls.

The side walls B rise above the level of the abutments and piers, so as to inclose the scale-platform and prevent debris, &c., passing thereunder. The abutments C to $C^4$ form ties between the walls and materially reinforce and strengthen the structure. Securing-bolts are embodied in the abutments and piers at the proper places to secure the bearing-plates thereto, as shown. The abutments C $C'$ $C^2$ $C^3$ $C^4$ are provided with recesses $c$ $c$ to accommodate the bearing-levers T, which partly depend into these slots and below the upper surface of the abutments. The pier $d$ is also slotted at $d'$ to accommodate the lever U in like manner.

When made of concrete in the manner described and shown, the foundation becomes essentially one integral mass of artificial rock, every part rigidly connected to the other, and being built *in situ* there is no opportunity for one part to yield before another or to get out of alinement. As no wood is required or used in the foundation, the bearing-plates remain accurately and certainly in position, unaffected by moisture or dryness, as they are where timber is employed, owing to the tendency of wood to swell when moist and shrink when dry, and which results almost invariably in scales mounted on wooden foundations or part wood foundations continually varying. I do not use wood, nor do I require iron beams in lieu thereof. The base-plate A, I consider most important, as it gives an enlarged bearing to every pier and abutment, and it also forms a perfect lateral bond between the abutment and piers, preventing their relative movement or displacement by unequal pressure or the action of moisture and frost. It also prevents the annoying accumulation of undergrowth in the scale-pit.

In constructing the foundation the best procedure is to make the necessary excavation for the scale in the desired position, then lay the base-plate and extension, and then mold the walls, abutments, and piers in position upon the base, all being built *in situ*, so that when completed the structure will be one solid mass of integral parts, the securing-bolts being located and embedded in the concrete during the molding thereof or located and set after the foundation is completed, being placed in holes drilled for the purpose with enlarged bottoms and fastened with lead or any hard substance desired. The top surface of the base-plate is preferably inclined slightly, so as to drain off any water which may drip thereinto, drain-passages $c^2$ being formed at the lower angles of the abutments $C'$ $C^2$ $C^3$ and a drain-outlet $c^3$ being formed in the wall of extension $A'$ at the lowest point thereof, as indicated in the drawings.

Having thus described my invention, what I claim as new, and desire to secure by Letters Patent, is—

1. A timberless foundation for track and wagon scales, composed of a base-plate, side and end walls surrounding the edges of the base-plate and forming therewith a hollow pan-like structure inclosing the scale on all sides and below; and transverse abutments connecting the side walls intermediate the end walls and supporting the scale-bearings, substantially as described.

2. A timberless scale-foundation for track and wagon scales having a base-plate, side and end walls rising from the edges of the base-plate, three transverse abutments connecting and bracing the side walls intermediate the end walls and carrying the bearing-plates of the scale-levers; and piers intermediate the abutments, for the purpose and substantially as described.

3. A timberless foundation for track and wagon scales, composed of a base-plate, side and end walls surrounding the edges of the base-plate and forming therewith a hollow pan-like structure; transverse abutments connecting the side walls and piers intermediate the abutments supporting the scale-bearings, the said side walls rising above the abutments and bearings, and said abutments having vertical slots.

4. A timberless foundation for scales, comprising a base underlying the entire scale, a series of transversely-arranged parallel abutments C, $C'$, $C^2$, $C^3$, $C^4$ rising from and extending across the base and connecting the side walls, piers rising from the base intermediate the abutments, and side and end walls surrounding the base-plate and extending above the tops of the abutments and piers, all being formed integrally of concrete molded *in situ*.

5. A timberless foundation for scales, comprising a base-plate, side and end walls around the edges of the base-plate, abutments connecting the side walls and piers intermediate the abutments, said walls rising above the abutments and piers; and all said parts being formed integrally of concrete, substantially as described.

6. The herein-described concrete foundation for scales, comprising a base-plate underlying the entire scale, a series of transversely-arranged parallel abutments rising from and extending entirely across the base-plate and connecting the side walls, piers rising from the base-plate intermediate the abutments, and side and end walls surrounding the base-plate, all being formed integrally and molded *in situ*, substantially as and for the purpose specified.

7. The herein-described concrete foundation for scales, comprising a base-plate underlying the entire scale, and having a lateral projection underlying the computing-platform; a series of transversely-arranged parallel abutments rising from and extending entirely across the base-plate and connecting the side walls, piers rising from the base-plate intermediate the abutments, and side and end walls surrounding the base-plate and the extension thereof, and extending above the tops of the abutments and piers, all being formed integrally and molded *in situ*, substantially as and for the purpose specified.

In testimony that I claim the foregoing as my own I affix my signature in presence of two witnesses.

GEORGE H. BIRCHARD.

In presence of—
B. S. JOHNSON,
H. T. GUILE.